: US 9,298,773 B2
(45) Date of Patent: Mar. 29, 2016

(54) NESTED COMPLEX SEQUENCE PATTERN QUERIES OVER EVENT STREAMS

(75) Inventors: Chetan Kumar Gupta, San Mateo, CA (US); Song Wang, Mountain View, CA (US); Abhay Mehta, Austin, TX (US); Mo Liu, San Jose, CA (US); Elke Angelika Rundensteiner, Acton, MA (US); Medhabi Ray, Worcester, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 236 days.

(21) Appl. No.: 13/431,773

(22) Filed: Mar. 27, 2012

(65) Prior Publication Data

US 2013/0066855 A1   Mar. 14, 2013

Related U.S. Application Data

(60) Provisional application No. 61/533,656, filed on Sep. 12, 2011.

(51) Int. Cl.
*G06F 17/30* (2006.01)
(52) U.S. Cl.
CPC .... *G06F 17/30477* (2013.01); *G06F 17/30864* (2013.01)
(58) Field of Classification Search
CPC .................. G06F 17/30554; G06F 17/30864; G06F 17/30424; G06F 17/30867
USPC ............ 707/722, 759, 769, 999.003, 999.005
See application file for complete search history.

(56) References Cited

U.S. PATENT DOCUMENTS

| | | | | |
|---|---|---|---|---|
| 8,521,867 | B2 * | 8/2013 | Srinivasan et al. | 709/224 |
| 8,539,511 | B2 * | 9/2013 | Etzion et al. | 719/318 |
| 8,543,558 | B2 * | 9/2013 | Srinivasan et al. | 707/702 |
| 2007/0168505 | A1 * | 7/2007 | Devadoss et al. | 709/224 |
| 2008/0301124 | A1 * | 12/2008 | Alves et al. | 707/5 |
| 2008/0301125 | A1 * | 12/2008 | Alves et al. | 707/5 |
| 2008/0301135 | A1 * | 12/2008 | Alves et al. | 707/6 |
| 2009/0006320 | A1 * | 1/2009 | Ding et al. | 707/2 |
| 2009/0171999 | A1 | 7/2009 | McColl et al. | |
| 2009/0292877 | A1 | 11/2009 | Piper et al. | |
| 2013/0103638 | A1 * | 4/2013 | Gupta et al. | 707/603 |

OTHER PUBLICATIONS

Jagrati Agrawal et al., Efficient Pattern Matching over Event Streams, 2008, ACM, 147-159.*

(Continued)

*Primary Examiner* — Jean B Fleurantin
(74) *Attorney, Agent, or Firm* — Fabian Vancott

(57) ABSTRACT

A method of evaluating nested complex sequence pattern queries includes obtaining events from an event stream and evaluating the events within a first window using an outer query to produce outer partial results. The method also includes determining a more stringent window constraint, the more stringent window constraint comprising a subset of the window constraint corresponding to events that produces the outer partial results and passing the more stringent window constraint to an inner query nested within the outer query. A complex event processing system is also provided.

20 Claims, 6 Drawing Sheets

(56) References Cited

OTHER PUBLICATIONS

Mo Liu et al., Sequence Pattern Query Processing over Out-of-Order Event Streams, 2009, IEEE, 784-795.*

Kawashima, H. et al..; "Complex Event Processing Over Uncertain Data Streams"; 2010 International Conference on P2P, Parallel, Grid, Cloud and Internet Computing; Nov. 4-6, 2010; pp. 521-526; IEEE Computer Society; http://ieeexplore.ieee.org/stamp/stamp.jsp?arnumber=5662592.

* cited by examiner

```
PATTERN  SEQ(Recycle r, Washing w,
            ! SEQ(Sharpening s, Disinfection d, Checking c, s.id=d.id=c.id=o.id),
            Operating o, r.id=w.id=o.id and o.ins-type="surgery")
WITHIN   1 hour
```

```
IntervalConstraints(result r_j, Query q_i) ()
01 Window W; Interval ts;
02 if(the root operator of q_i is SEQ)
03 {
04 nestedPosition = getNestedPosition(q_i);
05 if(nestedPosition == 0)
06    ts_left = getTime(r_j.LastEve) - W;
07 if(nestedPosition == r_j.size)
08    ts_right = getTime(r_j.FirstEve) + W;
09 else
10 {ts_left=getTime(r_j.get(nestedPosition-1))
11 ts_right=getTime(r_j.get(nestedPosition))}
12 }
13 if(the root operator of q_i is AND)
14 {ts_left = getTime(r_j.lastEve) - W;
15 ts_right = getTime(r_j.lastEve); return ts ;}
16 if(the root operator of q_i is OR)
17 {ts_left = getTime(r_j.lastEve) - W;
18 ts_right = getTime(r_j.lastEve); return ts;}
19 return ts;
```

*Fig. 3*

NESTED COMPLEX SEQUENCE PATTERN QUERIES OVER EVENT STREAMS

RELATED APPLICATIONS

The present application claims priority under 35 U.S.C. §119(e) from the following previously-filed Provisional Patent Application, U.S. Application No. 61/533,656, filed Sep. 12, 2011 by Chetan Gupta et al., entitled "Nested Complex Sequence Pattern Queries Over Event Streams" which is incorporated herein by reference in its entirety.

BACKGROUND OF THE INVENTION

Complex Event Processing (CEP) is a process for evaluating a variety of events occurring within an organization, process flow, or situation. Complex event processing identifies the most meaningful events, analyzes their impact to determine the occurrence or non-occurrence of a complex event, and takes subsequent action in near real time. The occurrence or nonoccurrence of a complex event may not be directly observable, but can be inferred from monitored event streams that lead up to or are related to the complex event.

BRIEF SUMMARY OF THE INVENTION

An execution strategy for nested complex event processing queries composed of sequence, negation, AND and OR operators is disclosed. Nested query execution is optimized based on techniques for selective caching of intermediate results, in particular interval-driven caching of sub-expressions along with their continuous maintenance method. One example is a method of evaluating nested complex sequence pattern queries that includes obtaining events from an event stream and evaluating the events within a first window using an outer query to produce outer partial results. The method may include determining a more stringent window constraint, the more stringent window constraint comprising a subset of the window constraint corresponding to events that produces the outer partial results and passing the more stringent window constraint to an inner query nested within the outer query. A complex event processing system may be provided.

BRIEF DESCRIPTION OF THE DRAWINGS

The accompanying drawings illustrate various examples of the principles described herein and are a part of the specification. The illustrated examples are merely examples and do not limit the scope of the claims.

FIG. 3 shows a series of commands for generating interval constraints, according to one example of principles described herein.

Throughout the drawings, identical reference numbers designate similar, but not necessarily identical, elements.

DETAILED DESCRIPTION

Complex event processing has become increasingly applicable in modern applications, ranging from supply chain management for RFID tracking to real-time intrusion detection. Complex event processing relies on a number of techniques including event-pattern detection, event abstraction, modeling event hierarchies, detecting relationships between events, and abstracting event driven processes. The use of pattern queries within a complex event processing engine allows identification of complex events in real time with high throughput and low latency. The complex event engine analyzes the likely impact of the identified complex events, mitigates risks, takes immediate response actions, and discovers opportunities. Complex event processing is widely relevant to areas such as finance, fraud detection, business intelligence, battlefield operation, and other areas. Ideally, CEP would support sophisticated pattern matching on real time event streams including the arbitrary nesting of sequence operators and the flexible use of negation in nested sequences. For example, CEP could be used to reporting on the state of medical equipment in a hospital and identify contaminated equipment in real time.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
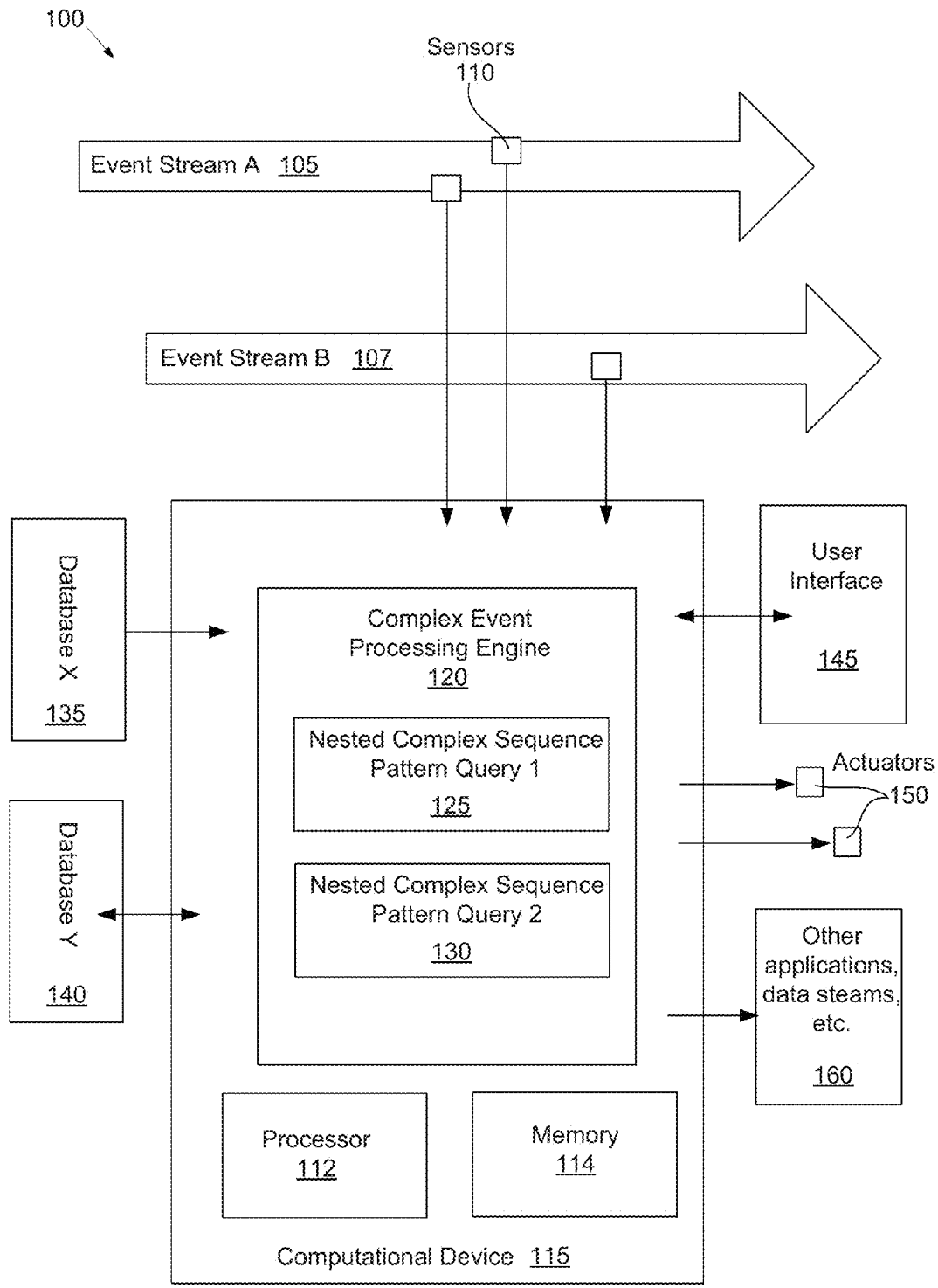
FIG. 1 is a diagram of a complex event processing system for making nested complex sequence pattern queries over event streams, according to one example of principles described herein.

FIG. 1 is a block diagram of a system (100) for execution of nested complex sequent pattern queries over event streams. Event streams (105, 107) are an ordered sequence of events that can be monitored by the complex event processing system to obtain real time or near real time data. Event streams may be bounded by a certain time interval or other criteria (content, space, source) or may be open ended and unbounded. The event stream may be ordered according to the time events occur or according to other characteristics of the data. An event stream may contain events of many different types. These events may be defined by a change of state within a physical or logical condition, with the change of state information including a time stamp defining the order of occurrence and a topology mark defining the location of the occurrence.

Sensors (110) in the event streams (105, 107) extract events for consumption by a complex event processing engine (120). In general, events that are directly extracted from event streams are simple events. Simple events are not viewed as summarizing, representing or denoting a set of other events. A complex event is an event that summarizes, represents, or denotes a set or sequence of other events. Depending on the context, a complex event may be "derived" event because the complex event may convey additional information that was not present in any of the events that gave rise to it. A complex event in one application may be viewed as a simple event in another application.

This event data is fed into a complex event processing engine (120). A computational device (115) hosts a complex event processing engine (120) by executing its instructions. The computational device (115) includes a processor (112)

and memory (114), and a number of other components such as input/output interfaces. Complex event processing systems typically monitor multiple event streams simultaneously and maintain a record of past events extracted from the event streams. These event records can be maintained in stacks or archived in databases (135, 140) for later retrieval.

The complex event processing engine (120) includes a number of nested complex sequence pattern queries (125, 130). In general, a pattern query is an evaluation of event instances to determine if the event instances match query criteria. The pattern query may contain event templates, relational operators and variables. Nested sequence queries are queries that include a hierarchy of queries and include outer queries and inner queries. The complex event processing engine accepts events from the event streams and evaluates them using the nested complex sequence pattern queries (125, 130). The results of these evaluations can be used in a number of ways. For example, the results can be written to a database (140), output to a user interface (145), used to control actuators (150), or entered into other applications, data streams, or engines (160).

The term "window" as related to complex event pattern queries (CEP) describes a bounded segment of events. The window may be defined by a specific time interval, pointers, events, or other designators. The nature of the window may be static or dynamic. For example, a sliding window is dynamic in the sense that it moves across the event stream and includes different events at different times. In another example, an event driven window has boundaries that are determined by the events in the event stream. For example, an event driven window may be defined by a pattern query. Events that satisfy the pattern query constraints are defined as being inside the window and events that do not are outside of the window.

Figures 2A, 2B:
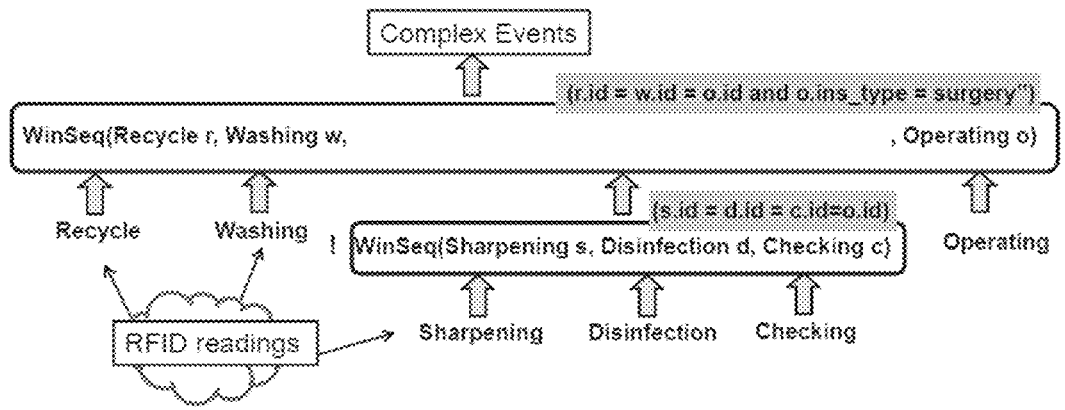
FIG. 2A is a block diagram of a query plan for a nested query, according to one example of principles described herein.
FIG. 2B is a sample query, according to one example of principles described herein.

FIGS. 2A and 2B describe an example of a nested complex sequence pattern query. In this example, CEP is used to report on the state of medical equipment in a hospital and identify contaminated equipment in real time. FIG. 2A is a block diagram describing the physical system and monitoring by the complex event pattern engine. In this example, the tools for medical operations are Radio Frequency Identification (RFID) tagged. The system monitors the histories of the equipment (such as, records of surgical usage, of washing, sharpening and disinfection). When a healthcare worker puts a box of surgical tools into a surgical table equipped with RFD readers, the computer would display approximate warnings such as "This tool must be disposed." FIG. 2B is shows a query Q1=SEQ (Recycle r, Washing w, NOT SEQ(Sharpening s, Disinfection d, Checking c), Operating op) Where ([ID](equality on ID) and op.ins-type="surgery") expresses this serious condition that after being recycled and washed, a surgery tool is being put back into use without first being sharpened, disinfected and then checked for quality assurance. Such complex sequence queries contain complex negation specifying the non-occurrence of composite event instances, such as negating the composite event of sharpened, disinfected and checked subsequences.

Nested CEP Query Plan

A nested query can be expressed by a nested algebraic query plan composed of the following algebraic operators: Window Sequence (WinSeq), Window Or (WinOr) and Window And (WinAnd). The same window w is applied to all operator nodes. During query transformation, each expression in the event pattern is mapped to one operator node in the query plan. WinSeq first extracts all matches to the positive components specified in the query, and then filters out events based on negative components as specified in the query. WinOr returns an event e if e matches one of the event expressions specified in the WinOr operator. WinAnd computes the cross product of its positive components. The predicates are placed into the proper positions in nested event expressions.

Nested CEP Query Processing Strategy

For simplicity, the implementation strategy for the SEQ operator is described, while the others can be implemented in a similar fashion. In this example, a stack-based strategy is used for execution of the nesting query operations. An indexing data structure named SeqState associates a stack with each event type in the query. Each received event instance is simply appended to the end of the corresponding stack. Event instances are augmented with pointers $ptr_i$ to adjacent events to facilitate quick locating of related events in other stacks during result construction.

The arrival of an event instance $e_m$ of the last event type $E_m$ of a query $q_i$ triggers the compute function of $q_i$. If $E_m$ is a negative event type, a postponed sequence evaluation is applied. When $E_m$ is a positive event type, the result construction is done by a depth first search along instance pointers $ptr_i$ rooted at that last arrived instance $e_m$. All paths composed of edges "reachable" by that root $e_m$ corresponds to one matching event sequence returned for $q_i$. When negative event types are specified in WinSeq, then during sequence construction any edges "reachable" from the root $e_m$ are skipped if an instance of the negative event type is found in the corresponding stream position. Events that are outdated based on the window constraints are purged. The outer query is evaluated first followed by its inner sub-queries. The results of the inner queries are passed up and joined with the results of the outer query.

In one implementation, nested execution passes down more stringent windows from outer queries to inner queries. FIG. 3 is a description of one technique for defining interval constraints for windows in complex nested pattern queries. For every outer partial query result, a constrained window is passed down for processing each of its children sub-queries. These sub-queries compute results involving events within the constraint window. Qualified result sequences of the inner operators are passed up to the outer parent operator and the outer parent operator then joins its own local results with that of its positive sub-queries. The outer sequence result is filtered if the result set of any of its negative sub-queries is not empty. An iterative execution can be applied until a final result sequence is produced by the root operator. The process repeats when the outer query consumes the next instance e.

Processing Nested Queries with Negation

This section describes one illustrative approach for supporting negations in nested queries. Flat queries can have negations and they are elegantly dealt with using the timestamp information. For example, if a flat query has a negative A between positive B and C event types, the query is first evaluated without the negation i.e., all B-C pairs are computed. Then each B-C pair is checked to determine if an A event occurred between the qualified B and C events. If the A event occurs, the corresponding B-C pairs are discarded.

For nested queries, a non-flat sub-query as a whole could also be negated. For example, a nested query may be represented as SEQ(A, ! AND(B, C), D). For each outer result of SEQ(A, D), a search is made for AND(B, C) results occurring between such A and D events. If none of the AND(B,C) results are found to exist, then the outer SEQ(A, D) result is returned, otherwise it is filtered out. Examples of query types in which the negation clause can occur are given below.

Bound by Upper Query.

The existence of a negative event instance could be bounded by positive event instances in the direct upper queries. Examples of this category include SEQ(A, !B, C) and SEQ(A, SEQ(B, !C), D). In the sub-query SEQ(B, !C), negative C events are bounded by B and D events. B events that do not have any C events occurring after them and before D events are passed up to our query SEQ(A, SEQ(B, !C), D). All B events passed up will be joined with the outer SEQ(A, D) result to construct SEQ(A, SEQ(B, !C), D) results.

Bound by Adjacent Query.

The existence of a negative event instance could be bounded by positive event instances of an adjacent sibling sub-query, Examples of this type include SEQ(A, SEQ(B, !C), SEQ(D, E), F) or SEQ(A, !B, SEQ(C, D), E). In this case, a contextually delayed constraint technique is used to conservatively pass up additional intermediate positive and negative results. In SEQ(A, SEQ(B, !C), SEQ(D, E), F), outer SEQ(A, F) results $<a_i, f_j>$ are constructed. The constraint window for both children sub-queries SEQ(B, !C) and SEQ(D, E) is $[a_i.te, f_j.ts]$. When processing the sub-query SEQ(B, !C) within the constraint window, an event of type B should be passed up even though C events exist after it within its constraint window. The reason is that in the same constraint window different matches for SEQ(D, E) may yet be found, and such a C event may end up occurring after the D, E subsequences. The outer query will be in a position to resolve this uncertainty when joining with sub-query results.

Processing Nested Queries with Correlated Predicates

Correlated predicates are conditions or requirements that extend from an outer query to an inner query. The approach of handling sub-queries with correlated predicates is similar to the basic nested execution above except that the join is not only based on timestamps but also on other predicates. A list of illustrative cases for predicate handling is given below.

Local Predicates.

Events are filtered based on predicate values before being stored in their stack. Query processing proceeds otherwise as explained above. For example, for the query in FIG. 2B, operating events where instrument type is not equal to surgery will be filtered.

Correlated Predicates Between Inner and Outer Queries.

Nested sub-queries may be correlated with their parent queries using predicates. In order to evaluate these queries with predicates, the attribute values can be passed down to the children queries as well as interval constraints. For example, the query in FIG. 2B requires events in the inner sub-queries have the same tool id as the outer match. For each outer SEQ(Recycle r, Disinfection d, Operating o) match, the tool id information for the operating instance is thus passed down to the children sub-queries. Inner query results involving events having the same tool id with the outer match are passed up.

Putting it all Together

At compile time, queries with negation bounded by an adjacent sub-query (as discussed above) are labeled with delayed constraint, More specifically, if a query $q_i$ is labeled with "delayed constraint", it not only needs to pass up potential $q_i$ results, but also stored negative events are passed up because it can not be determined locally if the negative events are in violation or not.

Example 1

Consider the query Q=SEQ(Recycle r, ! SEQ.(Washing w, Drying dr, Sharpening s), Disinfection d, SEQ(Checking c, Relabeling rl), Operating op). When event instances of types Recycle, Washing, Drying, Sharpening, Disinfection, Checking, Relabeling and Operating arrive, they are pushed into their respective stacks. The outer query is first evaluated for a given window size followed by the inner sub-query. The outer query construction is triggered by the arrival of Operating events which are of the rightmost positive event type in the root query. For every partial result $<r_i; d_j; opk>$ of the outer query SEQ(Recycle r, Disinfection d, Operating op), the window constraints for its children queries are computed. If this query is evaluated without predicates, all possible results for SEQ(Washing w, Drying dr, Sharpening s) and SEQ(Checking c, Relabeling rl) would be constructed for events that occur within $[r_i.te, d_j.ts]$ and $[d_j.te, opk.ts]$, respectively. The outer operator joins with all the results returned by its positive sub-query SEQ(Checking c, Relabeling rl). The outer result $<r_i, d_j, opk>$ fails if results of the negative child query SEQ (Washing w, Drying dr, Sharpening s) exist. When evaluating Q with correlated predicates [id], the id information is passed down from the outer query to the children sub-queries. Results involving events with the same id are constructed in the sub-queries.

Nested Query Optimization by Using Cache

The re-computation of the results for inner sub-queries every time an outer triggering event arrives can be computationally expensive. To mitigate this, a cache can be used to incrementally maintain the inner query results. CEP queries work on sliding windows and it is easy to see that many intermediate results would continue to be valid from one sliding window to the next. Previously calculated results of the previous window should be cached and then be reused in the new window. To avoid re-computation of results occurring in the same interval, a time interval can be extracted that covers the time period for all the possible results triggered by the same event e for a subexpression. Namely, the interval represents the minimum and maximum event time bounds for each subexpression. This meta-data "interval" can be attached to the respective cache to indicate the time period for which its results are cached for. This can guarantee that all possible results for each subexpression occurring within the bounds are stored in the respective cache. The caching process can also be modified to handle correlated predicates.

Cache Interval Extraction. Assume $Q_i$=SEQ($E_1$, ..., $E_i$, SEQ($E_i$+1, ..., $E_{i+j}$), $Ei_{+j}$+1, ..., $E_n$). For a given triggering event $e_n \in E_n$, the interval attached to the subexpression SEQ ($E_{i+1}$, ..., $E_{i+j}$) is $[\min(S_{E_i}), \max(S_{E_{i+j+1}})]$ where $\min(S_{E_i})$ ($\max(S_{E_{i+j+1}})$) represents the smallest (largest) event timestamp in the $E_i$ ($E_{i+j+1}$) stack when receiving $e_n$, respectively. The extracted interval is attached to each cache representing the valid time period for the cached results.

Interval-Driven Cache Expansion.

The cache content can be updated when a new triggering event $e_t$ arrives. For each subexpression, the interval "preInterval" [i, j] attached to the cache is compared to the new interval "curInterval" [m, n] just returned by the CacheIntervalExtraction function. New results are appended to the cache for each subexpression triggered by events occurring between the right bounds of preInterval and curInterval ([j, n]).

Interval-Driven Cache Reduction.

When a triggering event $e_t$ arrives, events with timestamp less than $e_t$—window are expired from their stacks. Similarly, caching results involving events with timestamp less than $e_t$-window are deleted from the cache as the window constraint will be violated if these results join with the new triggering event $e_t$ in the final result.

Example 2

Figure 4:
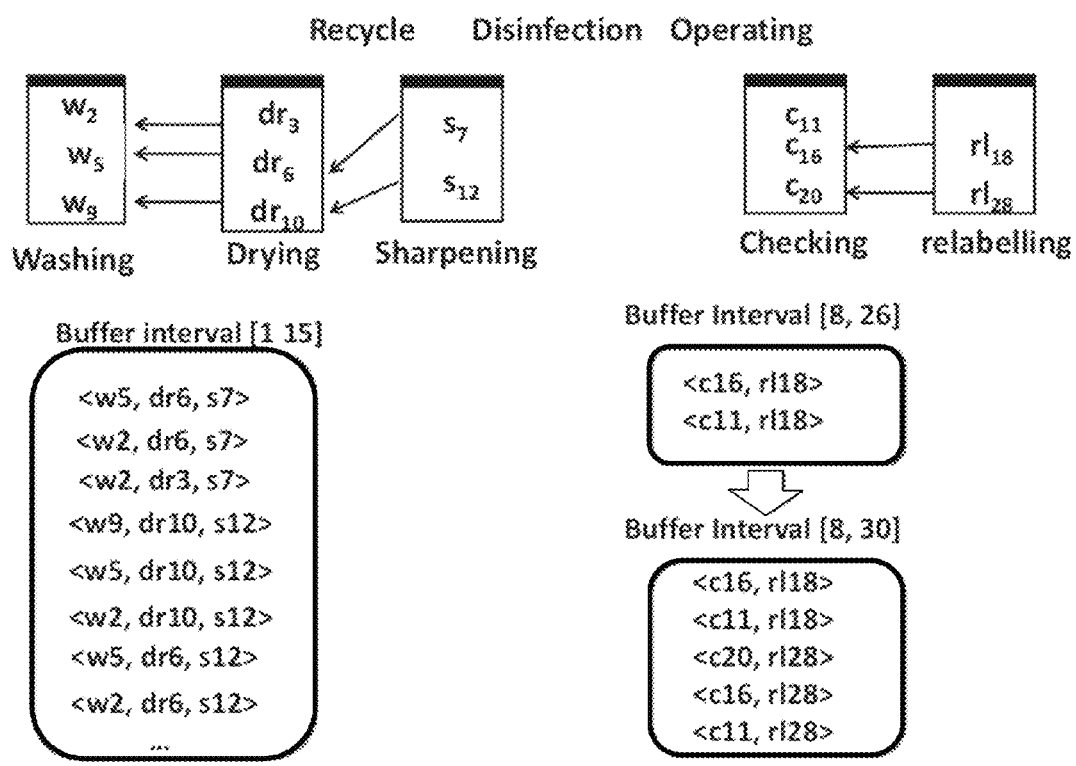
FIG. 4 is a block diagram of interval driven caching, according to one example of principles described herein.

FIG. 4 is a block diagram of interval driven caching. When the triggering event $o_{26}$ arrives, it is inserted into the operating stack and triggers execution. Extracted time intervals [1, 15]

and [8, 26] are for the subexpressions SEQ(Washing, Drying, Sharpening) and SEQ(Checking, Relabeling), respectively. SEQ(Washing, Drying, Sharpening) results are constructed based on all events that occurred during the interval [1, 15]. Similarly, SEQ(Checking, Relabeling) events occurring during interval [8, 26] are constructed and cached. When the new triggering event $o_{30}$ arrives, SEQ(Washing, Drying, Sharpening) is determined to still be within the interval [1, 15]. Thus the cache is still complete and the results in the cache can be reused. For subexpression SEQ(Checking, Relabeling), the new interval [8, 30] overlaps with the previous interval [8, 26]. Conceptually, the caching results related to [8, 26] could be reused and compute the new additions to the cache. New SEQ(Checking,Relabeling) results are triggered by Relabeling events occurring between [26, 30] such as $rl_{28}$. Assume the window size is 30.

When $o_{34}$ arrives, all caching results involving primitive events with time-stamp less than 4 expire. So $<w_2, dr_6, s_7>$, $<w_2, dr_3, s_7>$ etc are deleted from the cache. The meta-data attached to the cache for SEQ(Washing, Drying, Sharpening) is updated from interval [1, 15] to interval [4, 15].

Figure 5A:
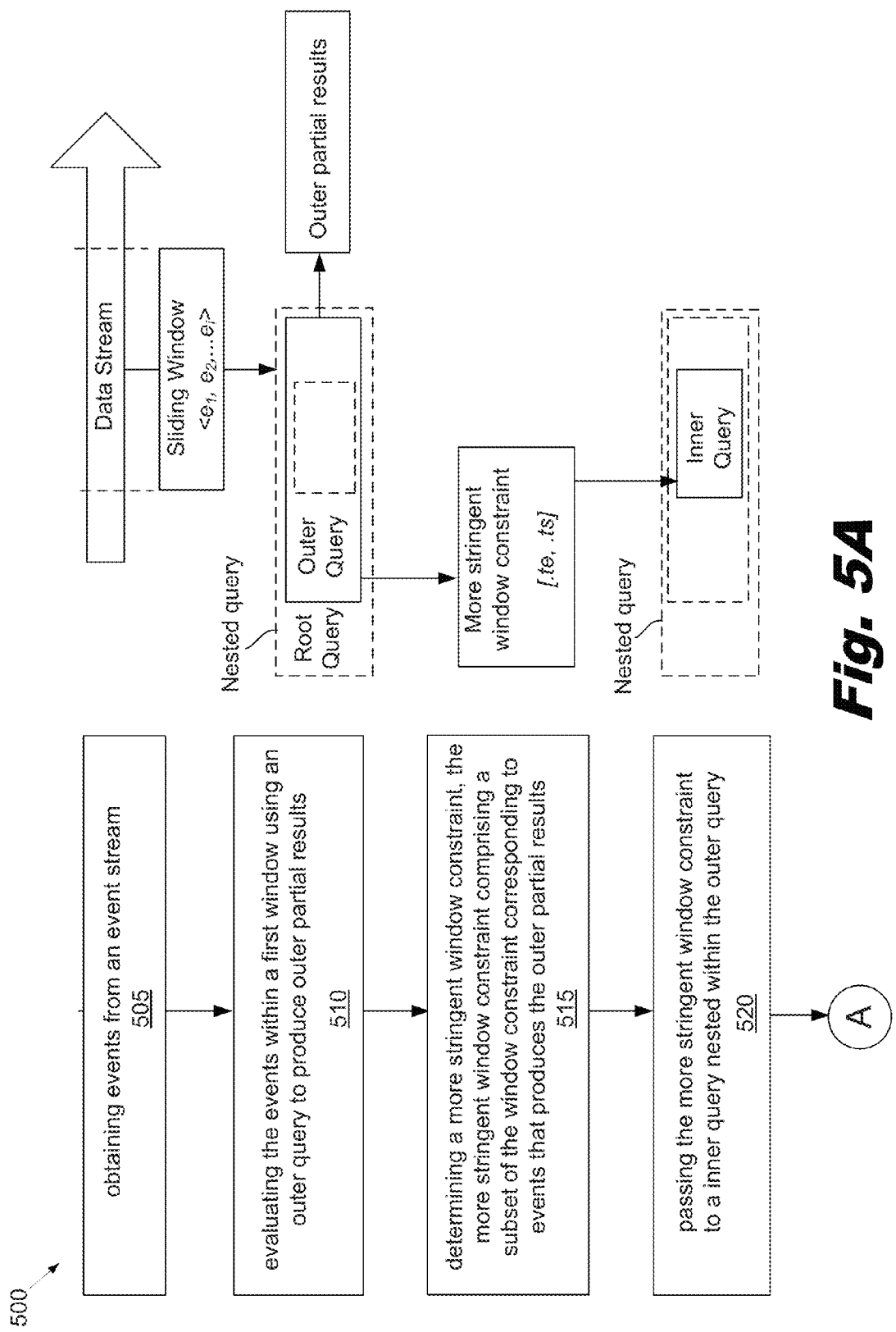
FIGS. 5A and 5B show a flowchart and block diagrams of a method for evaluating nested complex sequence pattern queries over event streams, according to one example of principles described herein.
Figure 5B:
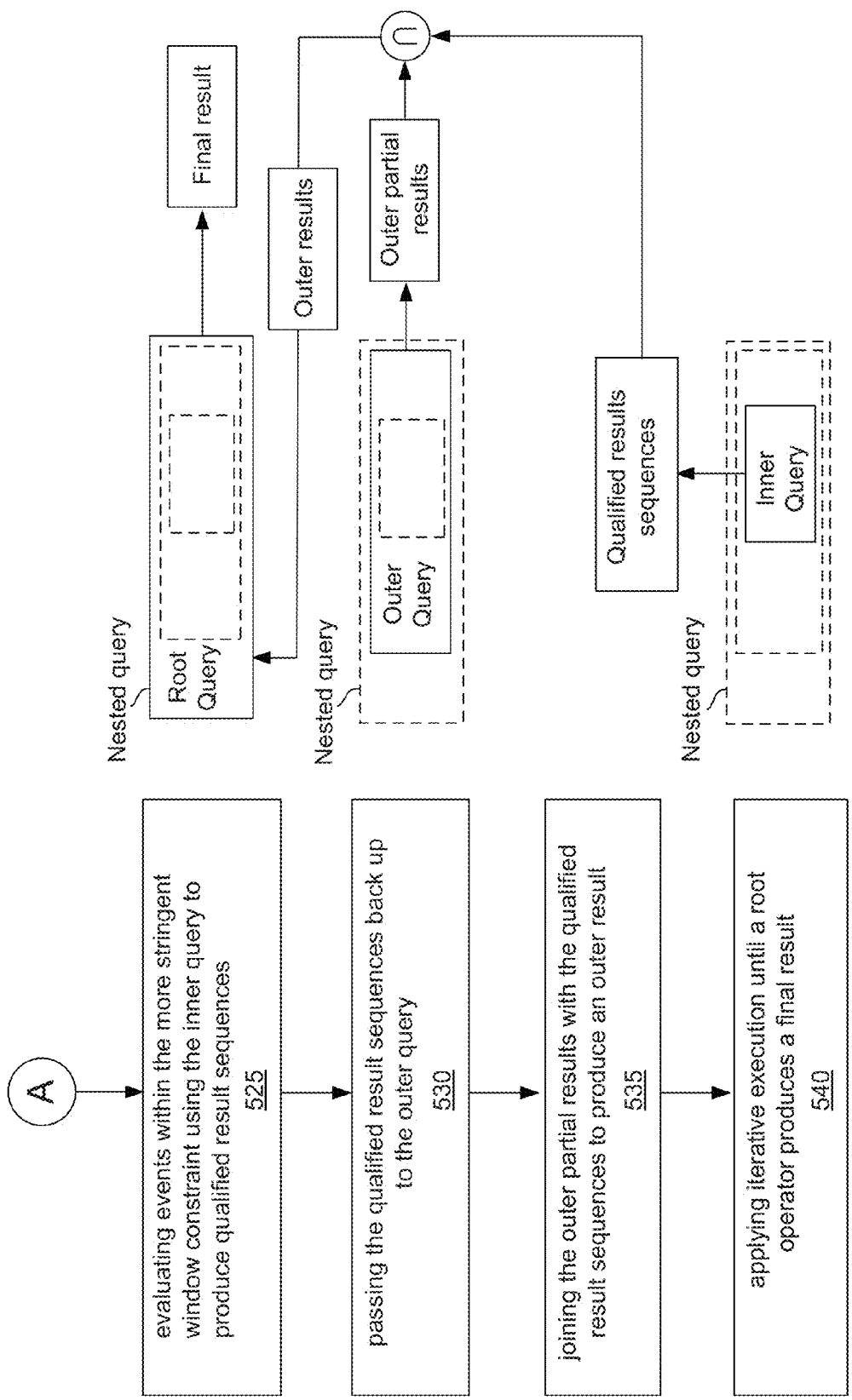

FIGS. 5A and 5B show a flowchart and corresponding block diagram of an illustrative method for evaluating nested complex sequence pattern queries over event streams. The pattern queries may or may not include negation. The method includes obtaining events from an event stream (block 505). The events may be filtered or extracted from the event stream using a number of methods, including using a sliding window. As shown in FIG. 4, these events may be allocated to stacks based on their characteristics.

The events from the event stream are evaluated using an outer query to produce outer partial results (block 510). A more stringent window constraint is determined and includes the events that were used to generate the outer partial results (block 515). The more stringent window includes only events that qualify under the outer query criteria and consequently contains fewer events than the original sliding window. This more stringent window constraint is passed to an inner query nested within the outer query (block 520). A variety of other information can be passed to the inner query to further restrict the number of events that the inner query evaluates. For example, correlated predicates may be passed between nested inner and outer queries. The process can continue in a variety of ways, including those described below.

Now moving to FIG. 5B, the events within the more stringent window constraint are evaluated using the inner query to produce qualified result sequences (block 525). Because the more stringent window has eliminated events that do not need to be evaluated by the inner query, the inner query can be more efficiently and quickly executed. The inner query may use a number of techniques to evaluate the event set within the more stringent window. For example, if a negation is bounded by an adjacent sub-query/inner query, then a delayed constraint can be used during evaluation of the adjacent sub-query to avoid discarding events that should be evaluated in the context of the negation.

The qualified result sequences are passed back up to the outer query (block 530), The qualified result sequences and outer partial results are joined to produce an outer result (block 535). In this example, the set intersection symbol has been used to indicate the joining process. This indicates that elements which the two sets have in common are passed into the outer results. A variety of other operators, series of operators, or other constructs can be used to appropriately join the two sets. For example, if the inner query comprises a negative query that produces a result set that is not empty, the associated outer partial results can be removed from the outer results.

This method can be iteratively executed for each inner query and each outer query until a root operator produces a final result (block 540). When the outer query is consumes the next event, the method can be repeated including evaluating the events within the new window constrain, determining the more stringent window constraint and passing the more stringent window constraint to an inner query nested within the outer query.

This comprehensive strategy for processing nested CEP queries includes an algebraic query plan for the execution of nested CEP queries and a window constraint tightening technique to correctly process sub-queries. Execution strategies for handling predicates include optimization techniques including interval driven cache expansion and reduction.

The preceding description has been presented only to illustrate and describe examples of the principles described. This description is not intended to be exhaustive or to limit these principles to any precise form disclosed. Many modifications and variations are possible in light of the above teaching.

The invention claimed is:

1. A computer-implemented method of evaluating nested complex sequence pattern queries comprising:
   obtaining events from an event stream;
   evaluating the events within a first window using an outer query to produce outer partial results;
   determining a more stringent window constraint by applying a number of correlated predicates to the outer partial results to eliminate events that are not to be evaluated, the more stringent window constraint comprising a subset of the window constraint corresponding to events that produce the outer partial results; and
   passing the more stringent window constraint to an inner child sub-query nested within the outer query;
   wherein the applying a number of correlated predicates comprises passing a predicate attribute value from the outer query to the inner child sub-query to correlate the outer query with the inner query, the events within the window constraint are generated being evaluated against the predicate attribute value by the inner child sub-query to generate inner child sub-query results that determine which events are relevant to the outer query and which events are not relevant to the outer query; and
   wherein partial outer results from the outer query are joined with the inner child sub-query results of the inner child sub-query.

2. The method of claim 1, further comprising:
   evaluating events within the more stringent window constrains using the inner query to produce qualified result sequences; and
   passing the qualified result sequences back up to the outer query.

3. The method of claim 2, further comprising joining the outer partial results with the qualified result sequences to produce an outer.

4. The method of claim 1, further comprising:
   allocating events into stacks; and
   applying iterative execution until a root operator produces a final result.

5. The method of claim 1, further comprising, when the outer query consumes the next event, repeating:
   evaluating the events within the window constraint;
   determining the more stringent window constraint; and
   passing the more stringent window constraint to an inner query nested within the outer query.

6. The method of claim 1, further comprising passing correlated predicates between nested inner and outer queries.

7. The method of claim 1, further comprising filtering outer partial results if the inner query comprises a negative query that produces a result set that is not empty.

8. The method of claim 1, further comprising if a negation is bounded by an adjacent sub-query, then using a delayed constraint during evaluation of the adjacent sub-query.

9. A complex event processing system comprising:
a computing device having a processor;
a complex event processing engine for receiving an event from an event stream, in which the complex event processing engine is hosted by the computing device;
the complex event processing engine to execute a nested complex sequence pattern query comprising:
an outer query;
an inner child sub-query nested within the outer query, in which the outer query is evaluated prior to evaluation of the inner child sub-query; and
a window constraint derived from the outer query and based on a number of correlated predicates that determine which events are to be evaluated, the window constraint being passed down to the inner child sub-query, the inner child sub-query being evaluated within the window constraint;
wherein the window constraint comprises a predicate attribute value and wherein the predicated attribute value is passed from the outer query to the inner child sub-query to correlate the outer query with the inner child sub-query, the events within the window constraint are generated being evaluated against the predicate attribute value by the inner child sub-query to determine which events are relevant to the outer query and which events are not relevant.

10. The system of claim 9, in which window constraints are generated for each partial result of the outer query and each of the window constraints is passed down a respective inner child sub-query for evaluation, the inner child sub-query computing results based on events within the event stream constrained by the window constraints to produce qualified result sequences.

11. The system of claim 10, in which the qualified result sequences are passed up to the outer query.

12. The system of claim 11, further comprising local results generated by the outer query, in which the outer query joins the qualified result sequences with the local results.

13. The system of claim 9, further comprising a root operator, in which evaluation of the outer query and inner child query are performed iteratively and passed upward to the root operator until a final result sequence is produced by the root operator.

14. The system of claim 9, in which the inner child sub-query comprises a negative event instance bounded by positive event instances in the outer query, in which the positive event instances are first evaluated and define the window constraint; the window constraint is passed to the inner child sub-query, the inner child sub-query for evaluating event instances in the window constraint and passing the subset of events that meet the negative criteria back up to the outer query.

15. The system of claim 9, wherein said complex event processing engine further configured for, if a negation is bounded by an adjacent sub-query, using a delayed constraint during evaluation of the adjacent sub-query.

16. The system of claim 9, wherein said complex event processing engine further configured for filtering outer partial results if the inner query comprises a negative query that produces a result set that is not empty.

17. A complex event processing system comprising a processor
an event stream;
a computing device;
a complex event processing engine for receiving event front the event stream, in which the complex event processing engine is hosted by the computing device by executing computer readable instructions by a processor in the computing device;
a cache fir incrementally maintaining a number of query results;
nested complex sequence pattern query executed by the complex event processing engine, the nested complex sequence pattern query comprising:
an outer query;
an inner child sub-query nested within the outer query, in which the outer query is evaluated prior to evaluation of the inner child sub-query;
a window constraint derived from the outer query, the window constraint being passed down to the inner child sub-query, the inner child sub-query being evaluated within the window constraint, in which window constraints are generated for each partial result of the outer query and each of the window constraints is passed down a respective inner child sub-query for evaluation, the inner child sub-query computing results based on events within the event stream constrained by the window constraints to produce qualified result sequences that are passed up to the outer query, and wherein the cache incrementally maintains a number of the inner child sub-query computing results; and
local results generated by the outer query, in which the outer query joins the qualified result sequences with the local results;
a root operator, in which evaluation of the outer query and inner child query are performed iteratively and passed upward to the root operator until a final result sequence is produced by the root operator;
a contextual delay constraint for passing up intermediate results when evaluating even instances in the window constraint with the inner child sub-query;
local predicates for filtering events before being stored in a stack; and
a predicated attribute value passed from the outer query to the inner child query to correlate the outer query with the inner child query, the events within the window constraint being evaluated against the attribute value by the inner child query to determine which events are relevant to the outer query with those events that are not relevant not being evaluated; in which partial outer results from the outer query are joined with the inner query results of the inner child query.

18. The system of claim 17, in which the inner child sub-query comprises a negative event instance bounded by positive event instances in the outer query, in which the positive event instances are first evaluated and define the window constraint; the window constraint is passed to the inner child sub-query, the inner child sub-query for evaluating event instances in the window constraint and passing the subset of events that meet the negative criteria back up to the outer query.

19. The system of claim 18, wherein the negative event instance is bounded by positive event instances of an adjacent child sub-query of the outer query.

20. The system of claim 17, wherein storing events in a stack comprises associating a stack of events with one of a number of event types identified in the nested complex sequence pattern query using an indexing data structure.

\* \* \* \* \*